POLYOLEFIN MOLDING COMPOSITION CONTAINING 20-90 WT. % OF $CaSO_3$ OR $CaSO_3 + CaSO_4$ + 0.5-10 WT. % OF POLYVINYL ACETATE (OPTIONAL)

SHEET FORMING

SURFACE TREATMENT ← AQUEOUS SOLUTION OF HCl, $H_2SO_4$, $HNO_3$ OR WATER SOLUBLE ALKALI METAL PHOSPHATE

NEUTRALIZING AND/OR RINSING

SHEET WITH SURFACE RECESSES

United States Patent Office 3,660,551
Patented May 2, 1972

3,660,551
METHOD OF IMPROVING PROPERTIES OF POLYOLEFIN SHEET
Rinnosuke Susuki, Tokyo, Hiroshi Hoshi, Narashino-shi, Jiro Saito, Tokyo, Humio Ito, Ishikawa-shi, and Keiichi Murakami, Sendai-shi, Japan, assignors to Lion Fat & Oil Co., Ltd., Tokyo, Japan
No Drawing. Filed Dec. 15, 1969, Ser. No. 885,341
Claims priority, application Japan, Dec. 21, 1968, 43/93,777; Dec. 23, 1968, 43/93,871; May 13, 1969, 44/36,188
Int. Cl. B29d 7/14, 27/00; C08 47/22
U.S. Cl. 264—49  5 Claims

ABSTRACT OF THE DISCLOSURE

A method of improving the properties of polyolefin sheet characterized by the steps that: a polyolefin resin such as polyethylene, polypropylene or a copolymer of ethylene and propylene containing calcium sulfite or polyvinyl acetate together with said calcium sulfite is subjected to calendering or extrusion molding to form a sheet and the sheet is subjected to treatment with an inorganic acid or an aqueous solution of phosphate.

BACKGROUND OF THE INVENTION

(a) Field of the invention

The present invention relates to a novel method of improving the properties of polyolefin in which a polyolefin resin is kneaded with an inorganic filler or a certain polymer together with said filler as an additive, the thus kneaded mixture is molded into a polyolefin sheet by a conventional process and the resultant sheet is subjected to a chemical treatment wih an aqueous solution of an inorganic compound capable of reacting with the foregoing additive.

(b) Descripton of the prior art

A polyolefin such as polyethylene, polypropylene or copolymer of ethylene and propylene possess properties inherent to waxes, and, accordingly, the surface of a sheet and the like made from said polyolefin is smooth and has a waxy luster, resulting in a very poor adhesive porperty and printability, and it is almost impossible to write on it. With a view to improving such properties, a variety of methods, such as subjecting the surface of the sheet to flame treatment or corona-discharge treatment or causing particles of a specific substance other than polyolefin to adhere onto the surface of sheet, have hitherto been proposed. These methods, however, relate to the surface treatment of an existing sheet, and this not only has its merits and demerits from the view-point of effectiveness, but has proved insufficient for achieving the expected results. Above all, it has not been suggested to make a paperlike sheet having a surface capable of accepting writing with ink.

SUMMARY OF THE INVENTION

The present invention relates to a method of improving the properties of polyolefin sheet comprising the steps of: incorporating in a polyolefin resin such as polyethylene, polypropylene or a copolymer of ethylene and propylene, calcium sulfite or polyvinyl acetate together with said calcium sulfite then subjecting the composition to calendering or extrusion molding to form a sheet, and then subjecting the sheet to treatment with an inorganic acid solution or an aqueous solution of phosphate.

The primary object of the present invention is to provide a polyolefin sheet which is equal to an ordinary paper or can compare with a slick paper in appearance by enhancing the whiteness as well as the nontransmittancy of a polyolefin sheet by reducing the visible-ray transmittancy, while increasing the visible-ray reflexibility, of said sheet.

Another object of the present invention is to impart a polyolefin sheet with superficial properties closely resembling that of paper, so as to make possible writing, drawing, printing, etc. directly onto its surface without applying any particular surface treatment except for making the surface of said polyolefin sheet rough and coarse by virtue of the effusion of extra-fine particles of calcium sulfite from its surface.

A further object of the present invention is to provide a polyolefin sheet, which presents a paperlike appearance by virtue cf the effusion of the filler existing near the surface of said sheet and, at the same time, is as thick and heavy as art paper due to the presence of a major portion of calcium sulfite, the filler, in the inner part of the sheet.

DESCRIPTION OF THE PREFERRED EMBODIMENTS

Figure 1:
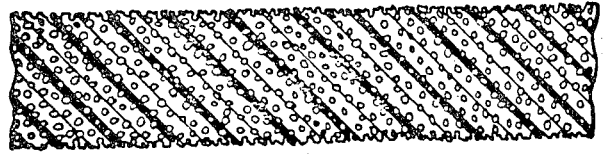
FIG. 1 is a sectional view, on an enlarged scale, of the sheet product of the process of the invention.

Calcium sulfite has the form of extra-fine particles and has a good miscibility with polyolefin resin, so that it can be mixed to the extent of 90% by weight even when said resin is molded into sheet, and when its mixing rate is 70% by weight or thereabout, the strength of the resultant sheet is not greatly deteriorated, and the molding characteristic of the resin is not impaired, either. Therefore, a polyolefin sheet containing calcium sulfite kneaded therein is usuable as a packing material in place of a thick paper. But, inasmuch as said sheet retains the inherent properties of the polyolefin intact, it has a waxy external luster and a poor adhesive property, and, moreover, it is very poor in such properties as writability, printability, etc.

In view of the foregoing, we have succeeded in preparing a polyolefin sheet having properties similar to that of paper made from wood pulp, by means of further treating the foregoing sheet with an inorganic acid solution or an aqueous solution of phosphate.

In other words, according to the present invention, the desired object is accomplished by the process which comprises treating a polyolefin sheet consisting of polyethylene, polypropylene or a copolymer of ethylene and propylene and containing 20–90% by weight of calcium sulfite as a filler with a solution of inorganic acid such as hydrochloric acid, sulfuric acid, nitric acid or phosphoric acid or an aqueous solution of phosphate, thereby causing calcium sulfite existing near the surface of said sheet to effuse.

When a polyolefin sheet containing calcium sulfite is treated with an inorganic acid solution and said inorganic acid is hydrochloric acid, sulfuric acid or nitric acid, calcium sulfite existing near the surface of said sheet is caused to effuse, resulting in the creation of innumerable minute holes on said surface. When phosphoric acid solution or phosphate is employed as the treating agent for the sheet, said agent reacts with calcium sulfite existing near the surface of sheet, thereby producing water-soluble acid calcium phosphate, and when the thus treated sheet is rinsed with water, there are created innumerable minute holes on the surface thereof. Properties similar to that of paper for a polyolefin sheet are, in fact, realized by virtue of the minute holes created as above.

Further, in the present invention, it is possible to employ polyvinyl acetate in addition to calcium sulfite, the filler, for mixing with the polyolefin resin. As said polyvinyl acetate has glass-transition point approximating a room temperature and its softening point is rather low as compared with the polyolefin, in a sheet prepared from a polyolefin mixture containing polyvinyl acetate and calcium sulfite, the polyvinyl acetate oozes out to the surface of the sheet in the form of microscopic droplets. When the sheet in such condition is treated with the foregoing inorganic acid, there occurs effusion of calcium sulfite existing near the surface of sheet and, at the same time, polyvinyl acetate contained in the surface of sheet is hydrolyzed bringing about innumerable micro-protuberances of polyvinyl alcohol which cover the surface of sheet. The sheet thus hydrolyzed is deprived of the superficial properties inherent to polyolefin and instead possesses a surface having properties of a striking likeness to paper, thereby well permitting the writing in ink thereon.

The polyolefin according to the present invention means a polyolefin resin such as polyethylene, polypropylene and the like or a copolymer of ethylene and propylene, but, from the view-point of the cost and properties, medium-pressure polyethylene and low-pressure polyethylene or polypropylene are most suitable for the present invention. As the filler, calcium sulfite in the quantity not exceeding about 90% by weight of the total quantity of the intended final mixture is employed, but a good portion (say, about one half the quantity) of said calcium sulfite may be substituted by calcium sulfate or some other conventional filler. In case of such a substitution, however, there remains some calcium sulfate contained in the surface of the product obtained from said mixture, so that the surface of such product is more rough and coarse than that employing calcium sulfite alone. The optimum quantity of calcium sulfite to be added as the filler is 70% by weight or thereabout from the view-point of quality as well as the cost of manufacture. Though little trouble is brought about by a decrease in the quantity of the filler, if said quantity is less than 20% by weight, it will result in an increase in cost as well as an insufficiency of the whiteness and opacity of the product and, therefore, is undesirable. As to the quantity of polyvinyl acetate, on the other hand, it is sufficient to use same in an amount in the range of 0.5–10% by weight of the total quantity of the mixture.

Since a great quantity of the filler is employed according to the present invention, a small quantity of viscosity improver is sometimes employed for the purpose of facilitating the molding process, and, if necessary, such common additives as a stabilizer, age resistor, etc. may also be employed. But, in the following examples, employment of these additives has been excluded for the purpose of clarifying the essential aspects of the present invention. In this connection, the sheet-molding in the present invention is carried out by calendering or extrusion molding as is known in the prior art.

As to the inorganic acid to be employed, any such acid will do, provided that it is capable of making calcium sulfite to effuse. Suitable acids include, for instance, hydrochloric acid, sulfuric acid, orthophosphoric acid, nitric acid, etc., and, from the view-point of practical use, hydrochloric acid is most suitable. And, as for the phosphate, water-soluble phosphates of alkali metal such as sodium phosphate, potassium phosphate, etc. are suitable.

EXAMPLE 1

A mixture consisting of 28% by weight of a commercially available polyethylene and, as the filler, 22% by weight of calcium sulfite and 50% by weight of calcium sulfate dihydrate, was subjected to calendering, whereby a sheet of 0.1 mm. in thickness was prepared. A test piece measuring 10 cm. x 20 cm. was cut from said sheet and dipped for 2 minutes in 10% aqueous solution of hydrochloric acid heated to 100° C. Subsequently, the thus treated test piece was neutralized with 5% aqueous solution of caustic soda, rinsed with water and dried, thereby producing a product. The visible-ray transmittancy and reflexibility of said product as compared with that of a sheet not subjected to acid treatment as above were as shown in the following Table 1.

TABLE 1

|  | Sheet not treated with acid | Sheet according to the present invention |
|---|---|---|
| Visible-ray transmittancy (percent) | 58 | 11 |
| Visible-ray reflexibility (percent) | 40 | 87 |

Remark.—Visible-ray transmittancy of a common art paper is in the range of 10–12%.

EXAMPLE 2

A mixture consisting of 29% by weight of a commercially available polyethylene, 28% by weight of calcium sulfite and 43% by weight of calcium sulfate dihydrate was subjected to calendering, whereby a sheet of 0.1 mm. in thickness was prepared.

The foregoing sheet was dipped for 2 minutes in 5% aqueous solution of hydrochloric acid heated to 100° C. Subsequently, the thus treated sheet was neutralized with 8% aqueous solution of caustic soda, rinsed with water and dried, thereby producing a product. The visible-ray transmittancy and reflexibility of said product as compared wtih that of a sheet not subjected to acid treatment as above were as shown in the following Table 2.

TABLE 2

|  | Sheet not treated with acid | Sheet according to the present invention |
|---|---|---|
| Visible-ray transmittancy (percent) | 62 | 12 |
| Visible-ray reflexibility (percent) | 43 | 87 |

EXAMPLE 3

A mixture consisting of 30% by weight of a commercially available polyethylene and 70% by weight of calcium sulfite as the filler was subjected to calendering, whereby a sheet of 0.1 mm. in thickness was prepared. In this connection, the conditions of operation in the foregoing processing were as follows: temperature was 160±50° C., the speed for processing was 90 m./minutes, and the roll-clearance was 0.07 mm.

A test piece measuring 10 cm. x 20 cm. was cut from said sheet and dipped for 2 minutes in 5% aqueous solution of orthophosphoric acid as heating up to 20±5° C., thereby effecting double reaction. Subsequently, the thus treated test piece was first rinsed with a large quantity of water and then subjected to a finishing rinsing and drying thereafter, whereby there was obtained a product. The visible-ray transmittancy and reflexiblity of said product as compared with that of a sheet not subjected to said double-reaction treatment were as shown in the following Table 3.

TABLE 3

|  | Sheet according to the present invention | Sheet not subjected to double-reaction treatment |
|---|---|---|
| Visible-ray transmittancy (percent) | 18 | 58 |
| Visible-ray reflexibility (percent) | 80 | 40 |

EXAMPLE 4

A mixture consisting of 30% by weight of a commercially available polyethylene, 28% by weight of calcium sulfite and 48% by weight of calcium sulfate dihydrate was subjected to calendering whereby a sheet of 0.1 mm. in thickness was prepared. In this connection, the conditions of said calendering were the same as in Example 3.

A test piece measuring 10 cm. x 20 cm. was cut from said sheet and dipped for 20 minutes in 5% aqueous solution of orthophosphoric acid heated to 20±5° C., thereby effecting double reaction. Subsequently, the thus treated test piece was first rinsed with a large quantity of water and then subjected to a finishing rinsing and drying thereafter, whereby there was obtained a product. The visible-ray transmittancy and reflexibility of said product as compared with that of a sheet not subjected to said double reaction were as shown in the following Table 4.

TABLE 4

|  | Sheet according to the present invention | Sheet not subjected to double-reaction treatment |
| --- | --- | --- |
| Visible-ray transmittancy (percent) | 15 | 49 |
| Visible-ray reflexibility (percent) | 83 | 49 |

EXAMPLE 5

A mixture consisting of 26% by weight of a commercially available polyethylene, 4% by weight of polyvinyl acetate (polymerization degree: 1500) and 70% by weight of calcium sulfite was subjected to calendering, whereby a sheet of 0.1 mm. in thickness was prepared. Said sheet was then subjected to oxidation treatment with 10% hydrochloric acid solution at 100° C. for 5 minutes, and subsequently was neutralized by means of 5% aqueous solution of caustic soda. The properties of a product obtained through the foregoing treatments were as follows.

Properties of manufacture:

visible-ray transmittancy—10%
visible-ray reflexibility—87%
tear resistance:
   lengthwise—48 (g.)
   crosswise—70 (g.)

As for the degree of the visible-ray transmittancy and reflexibility among those properties of said product, it was a match for the whiteness of a slick paper, and by virtue of such improvement of properties thereof, a manufacture resulting from the foregoing treatments could afford free writing—particularly writing in ink—and also printing thereon.

EXAMPLE 6

A mixture consisting of 27% by weight of a commercially available polypropylene, 33% by weight of calcium sulfite as the filler and 33% by weight of gypsum was subjected to calendering, whereby a sheet of 0.08 mm. in thickness was prepared. In this connection, the conditions of said calendering were as follows: the temperature was 170±10° C., the speed for molding processing was 120 m./min. and the roll-clearance was 0.06 mm.

A test piece measuring 10 cm. x 20 cm. was cut from said sheet and dipped for 8 minutes in 10% aqueous solution of sulfuric acid heated to 50° C. Subsequently, the thus treated test piece was neutralized with 8% aqueous solution of caustic soda and then rinsed with water, thereby producing a product.

The visible-ray transmittancy and reflexibility of said product as compared with that of a sheet not subjected to the foregoing acid treatment were as shown in the following Table 5.

TABLE 5

|  | Sheet according to the present invention | Sheet not subjected to acid treatment |
| --- | --- | --- |
| Visible-transmittancy (percent) | 20 | 64 |
| Visible-ray reflexibility (percent) | 79 | 33 |

EXAMPLE 7

A mixture consisting of 28% by weight of a commercialized polyethylene-polypropylene copolymer, 2% by weight of polyvinyl acetate (mean polymerization degree: 1000), 35% by weight of calcium sulfite and 35% by weight of gypsum was subjected to calendering in the same manner as that of Example 3, whereby a sheet of 0.07 mm. in thickness was prepared.

A test piece measuring 10 cm. x 20 cm. was cut from said sheet and dipped for 7 minutes in 10% aqueous solution of hydrochloric acid heated to 90° C. Subsequently, the thus treated test piece was neutralized with 5% aqueous solution of caustic soda, thereby producing a product having properties as shown in the following Table 6 in comparison with that not subjected to the foregoing acid treatment.

TABLE 6

|  | Sheet according to the present invention | Sheet not subjected to acid treatment |
| --- | --- | --- |
| Visible-ray transmittancy (percent) | 18 | 62 |
| Visible-ray reflexibility (percent) | 81 | 35 |

What we claim is:

1. A process of making a sheet of a thermoplastic synthetic resin selected from the group consisting of polyethylene, polypropylene and copolymers of ethylene and propylene, which sheet has increased whiteness and surface roughness and is similar in appearance and writing properties to a wood pulp paper sheet, which process comprises the steps of:

forming a uniform mixture containing (A) from about 20% to 90% by weight of solid filler particles of small size, said filler particles being selected from the group consisting of (1) calcium sulfite particles and (2) a blend of at least 20% by weight of said mixture, of calcium sulfite particles and the balance is particles of calcium sulfate compound, the remainder of said mixture consisting essentially of (B) said resin;

forming said mixture into a sheet;

then applying to said sheet an aqueous treating solution of a treating agent selected from the group consisting of hydrochloric acid, sulfuric acid, nitric acid, orthophosphoric acid and water-soluble alkali metal phosphates, for a period of time sufficient to cause calcium sulfite particles on and near the surface of the sheet to effuse in order to form a multitude of minute recesses on said surface.

2. A process according to claim 1 in which said treating agent is selected from the group consisting of hydrochloric acid, sulfuric acid and nitric acid and including the additional step following the treating step, of applying an aqueous alkaline solution to the sheet to neutralize the acid.

3. A process according to claim 1 in which said treating agent is selected from the group consisting of orthophosphoric acid and water-soluble alkali metal phosphates so that in the treating step the calcium sulfite is converted to water-soluble acid calcium phosphate and including the additional step, following the treating step, of rinsing the sheet with water to dissolve said water-soluble acid calcium phosphate and thereby cause the formation of said recesses.

4. A process of making a sheet of a thermoplastic synthetic resin selected from the group consisting of polyethylene, polypropylene and copolymers of ethylene and propylene, which sheet has increased whiteness and surface roughness and is similar in appearance and writing properties to a wood pulp paper sheet, which process comprises the steps of:

forming a uniform mixture consisting essentially of (A) from about 20% to 90% by weight of solid filler particles of small size, said filler particles being selected from the group consisting of (1) calcium sulfite particles and (2) a blend of at least 20% by weight of said mixture of calcium sulfite and the balance is calcium sulfate compound, (B) from about 0.5% to 10% by weight of said mixture of polyvinyl acetate, the remainder of said mixture consisting essentially of (C) said resin;

forming said mixture into a sheet;

then applying to said sheet an aqueous treating solution of a treating agent selected from the group consisting of hydrochloric acid, sulfuric acid, nitric acid and orthophosphoric acid, for a period of time sufficient to cause calcium sulfite particles on and near the surface of the sheet to effuse in order to form a multitude of minute recesses on said surface and to hydrolyze the polyvinyl acetate on said surface to polyvinyl alcohol.

5. A process according to claim 4 including the additional step, following the treating step, of applying an aqueous alkaline solution to the sheet to neutralize the acid.

References Cited

UNITED STATES PATENTS

| | | | |
|---|---|---|---|
| 2,500,573 | 3/1950 | Rockoff | 264—48 X |
| 2,707,201 | 4/1955 | Fernald et al. | 264—49 X |
| 2,983,960 | 5/1961 | Jilge | 264—48 |
| 2,997,746 | 8/1961 | O'Brien et al. | 264—48 |
| 3,376,238 | 4/1968 | Gregorian et al. | 264—49 UX |
| 3,524,753 | 8/1970 | Sharp | 264—49 X |
| 3,534,130 | 10/1970 | Yamamoto et al. | 264—54 |

OTHER REFERENCES

Rose, Arthur and Elizabeth, "The Condensed Chemical Dictionary," Seventh Edition, completely revised and enlarged, New York, van Nostrand, Reinhold, 1969, p. 169.

PHILIP E. ANDERSON, Primary Examiner

U.S. Cl. X.R.

260—2.5 HA, 2.5 M; 264—175, 176, 340, 344

UNITED STATES PATENT OFFICE
CERTIFICATE OF CORRECTION

Patent No. 3,660,551    Dated May 2, 1972

Inventor(s) Rinnosuke Susuki, et al

Figure 2:
FIG. 2 is a flow diagram of the process of the invention.
Figure 2:
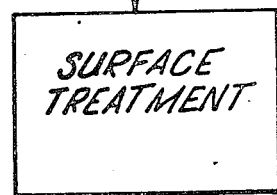
Figure 2:

It is certified that error appears in the above-identified patent and that said Letters Patent are hereby corrected as shown below:

The attached sheet, containing Figures 1 and 2, should be included in the patent.

Signed and sealed this 14th day of November 1972.

(SEAL)
Attest:

EDWARD M. FLETCHER, JR.
Attesting Officer

ROBERT GOTTSCHALK
Commissioner of Patents